United States Patent
Kappes et al.

(10) Patent No.: US 7,949,114 B2
(45) Date of Patent: May 24, 2011

(54) GRANTING PRIVILEGES TO A TELECOMMUNICATIONS TERMINAL BASED ON THE RELATIONSHIP OF A FIRST SIGNAL TO A SECOND SIGNAL

(75) Inventors: Martin Kappes, Frankfurt am Main (DE); P Krishnan, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1720 days.

(21) Appl. No.: 11/080,866

(22) Filed: Mar. 15, 2005

(65) Prior Publication Data

US 2006/0210039 A1 Sep. 21, 2006

(51) Int. Cl.
*H04M 3/00* (2006.01)
(52) U.S. Cl. .................... 379/189; 379/211.02
(58) Field of Classification Search .............. 379/189, 379/194, 201.01, 211.02, 212.01, 221.14, 379/233, 234, 245, 246
See application file for complete search history.

(56) References Cited

U.S. PATENT DOCUMENTS

| | | | |
|---|---|---|---|
| 6,360,102 B1 * | 3/2002 | Havinis et al. | 455/457 |
| 6,748,071 B2 | 6/2004 | Milton | |
| 6,751,309 B2 | 6/2004 | Milton | |
| 6,760,420 B2 | 7/2004 | Heilmann et al. | |
| 6,763,102 B1 | 7/2004 | Chen et al. | |
| 2002/0049915 A1 | 4/2002 | Yasushi et al. | |
| 2002/0102989 A1 * | 8/2002 | Calvert et al. | 455/456 |
| 2002/0115453 A1 * | 8/2002 | Poulin et al. | 455/456 |
| 2003/0217165 A1 | 11/2003 | Buch et al. | |
| 2004/0109541 A1 | 6/2004 | Celi, Jr. et al. | |
| 2009/0029717 A1 * | 1/2009 | Bates et al. | 455/456.1 |

FOREIGN PATENT DOCUMENTS

| | | |
|---|---|---|
| EP | 1427163 A2 | 6/2004 |
| GB | 2397731 A | 7/2004 |
| KR | EP 1 100 248 * | 5/2001 |
| WO | 01/13243 A1 | 2/2001 |
| WO | 01/67219 A1 | 9/2001 |

OTHER PUBLICATIONS

Shah, Antim G., "U.S. Appl. No. 11/121,677, Office Action", Dec. 11, 2008, Publisher: USPTO, Published in: US.
Shah, Antim G., "U.S. Appl. No. 11/121,677, Office Action Mar. 3, 2009", Publisher: USPTO, Published in: US.
Shah, Antim G., "U.S. Appl. No. 11/121,677, Office Action Sep. 3, 2009", Publisher: USPTO, Published in: US.
Shah, Antim G., "U.S. Appl. No. 11/121,677, Notice of Allowance Mar. 10, 2010", Publisher: USPTO, Published in: US.

* cited by examiner

*Primary Examiner* — William J Deane
(74) *Attorney, Agent, or Firm* — DeMont & Breyer, LLC

(57) ABSTRACT

A method and apparatus are disclosed that enable a data-processing system, such as a server, to determine whether or not to grant a telecommunications terminal one or more privileges, without some of the disadvantages of the prior art. Specifically, in accordance with the illustrative embodiments of the present invention, a call-processing server transmits, to a first terminal, a first signal for verifying a second terminal, such as one that has been designated by a user. The user is then required to transmit a second signal to the call-processing server via the second terminal. The call-processing server then examines the received second signal with respect to the first signal and determines whether or not to grant the second terminal a privilege (e.g., handling calls on behalf of the user, etc.), based on the relationship between the first and second signals.

23 Claims, 9 Drawing Sheets

GRANTING PRIVILEGES TO A TELECOMMUNICATIONS TERMINAL BASED ON THE RELATIONSHIP OF A FIRST SIGNAL TO A SECOND SIGNAL

FIELD OF THE INVENTION

The present invention relates to telecommunications in general, and, more particularly, to determining whether or not to grant a privilege to a telecommunications terminal.

BACKGROUND OF THE INVENTION

FIG. 1 depicts a block diagram of telecommunications system 100 in the prior art. Telecommunications system 100 comprises: designating telecommunications terminal 101, designated telecommunications terminal 102, call-processing server 103, telecommunications network 104, and telecommunications terminal 105, interconnected as shown.

Designating telecommunications terminal 101 is a personal computer (e.g., a laptop, etc.) that runs software that enables the terminal to provide telecommunications services to its user by transmitting and receiving packets of information. In this capacity, terminal 101 can be referred to as a softphone. Some of the telecommunications services that terminal 101 provides include placing and receiving calls, emailing, instant messaging, and so forth. Terminal 101 interacts with call-processing server 103 via a signaling channel to initiate a session to provide a telecommunications service. Terminal 101 uses the Session Initiation Protocol (or "SIP") set of rules to initiate a session. Once a session has been initiated, terminal 101 transmits via telecommunications network 104 session-related traffic, such as voice or data, in packet format to one or more destinations, and also receives, via network 104, session-related traffic from one or more sources. Terminal 101 transmits and receives traffic by using the Internet Protocol set of rules and, as such, is an Internet Protocol-based terminal that is capable of providing Voice over Internet Protocol (or "VoIP") to its user, among other services.

Designated telecommunications terminal 102 is a telecommunications terminal that is capable of exchanging information with call-processing server 103 for the purposes of transmitting or receiving voice or data traffic. Terminal 102 might be a packet-based terminal, similar to terminal 101, or it might be a circuit-based terminal based on older technology, such as a Plain Old Telephone Service (or "POTS") wireline telephone. As part of a call or session, terminal 102 transmits and receives voice and data traffic via what is sometimes referred to as a media channel.

Call-processing server 103 is a data-processing system (e.g., at an office building, at a central office switching center, etc.) that is capable of exchanging signaling information and traffic with terminals 101 and 102. Call-processing server 103's interaction with terminals 101 and 102 is supported by telecommunications network 104.

Telecommunications network 104 enables the transport of signaling information, as well as voice and data traffic, between the endpoints (e.g., terminal 101, call-processing server 103, etc.) in telecommunications system 100. Telecommunications network 104 might comprise one or more of the Public Switched Telephone Network, the Internet, one or more dedicated packet-based networks, and so forth.

The softphone functionality of designating telecommunications terminal 101 enables its user to designate an endpoint in telecommunications system 100, such as designated telecommunications terminal 102, as having one or more privileges. One example of a privilege is handling all calls made to the user. A softphone user might want to designate another terminal to handle calls because the other terminal, for example, (i) offers better quality, (ii) is more capable, or (iii) has greater reliability than the user's laptop. To designate terminal 102 to be the recipient of calls, the user enters the address of terminal 102 (e.g., a telephone number, an Internet Protocol address, etc.) on his laptop (i.e., terminal 101), and the softphone application transmits the user request to call-processing server 103.

The problem with a softphone having the capability to designate another terminal is that malicious software, or "malware," also can designate another terminal (e.g., telecommunications terminal 105, etc.) without the user's knowledge. The malware (e.g., a computer virus, etc.) introduced by an adversary could use the softphone for toll fraud in a manner described here. The malware could access and activate terminal 101, and designate the adversary's current terminal (i.e., terminal 105) to place and receive calls. The softphone could then be instructed to call the telephone number of the adversary's choice. The malware could be controlled via instructions from an external server to which the malware connects.

Some security techniques in the prior art offer some protection against malware. For example, the user could be required to provide a user name and password to the call-processing server in order to designate another terminal. Password-based techniques are fallible, however, in that either (i) the user might have already successfully gained access before the malware activates the softphone or (ii) the softphone might store the user name and password information as a convenience to the user, only to have the malware steal the information.

What is needed is a technique for determining whether or not to grant a telecommunications terminal one or more privileges, without some of the disadvantages of the prior art.

SUMMARY OF THE INVENTION

The present invention enables a data-processing system, such as a server, to determine whether or not to grant a telecommunications terminal one or more privileges, without some of the disadvantages of the prior art. Specifically, in accordance with the illustrative embodiments of the present invention, a call-processing server transmits, to a first terminal, a first signal for verifying a second terminal, such as one that has been designated by a user. The user is then required to transmit a second signal to the call-processing server via the second terminal. The call-processing server then examines the received second signal with respect to the first signal and determines whether or not to grant the second terminal a privilege (e.g., handling calls on behalf of the user, etc.), based on the relationship between the first and second signals.

Two illustrative embodiments of the present invention are disclosed. The first illustrative embodiment is applicable to a server determining, in general, whether or not to grant privileges to a terminal. The second illustrative embodiment is applicable to a server, along with an interactive voice response (IVR) system, determining whether or not to grant privileges to a designated terminal (e.g., a hotel room telephone, etc.), where the access to the terminal is controlled by a private branch exchange (e.g., a hotel switchboard staffed by an operator, etc.).

In accordance with the first illustrative embodiment of the present invention, the user of a first terminal (e.g., a softphone implemented on a laptop that runs Session Initiation Protocol, etc.) registers with a call-processing server and designates a second terminal (e.g., a home telephone, etc.) to receive traffic (e.g., voice traffic, data traffic, text messages, etc.) that is intended for the user. The server provides a first signal to the first terminal via the signaling channel, wherein the first signal represents information that requires an action by the user (e.g., providing a response, etc.). The server also calls the second terminal. The user answers the incoming call to the second terminal. Using the second terminal, the user provides back to the server (e.g., via entering selections on a keypad, etc.) a second signal that has some relationship to the first signal. For example, the first signal can be a distorted image of a word that is readable by the user, but not as easily readable by a machine (i.e., the first terminal), in which case the user in the second signal verifies the word back to the server using the second terminal. The user's terminal transmits the second signal to the server via a communications channel (e.g., a media channel, etc.) that is different than the signaling channel. If the second signal compares satisfactorily to the first signal, the server grants the second terminal privileges (e.g., placing calls, receiving calls, accessing a database, etc.).

In some alternative embodiments, instead of transmitting and receiving the first and second signals via a signaling channel and a media channel, the server transmits and receives the signals via another pair of different communications channels. For example, the two different communications channels can be a signaling channel and a circuit-switched channel, two different radio frequency channels, two different timeslots of information transmitted on the same wire, two transmission channels on different coaxial cables, and so forth.

In accordance with the second illustrative embodiment of the present invention, the user of a first terminal (e.g., a softphone implemented on a laptop or notebook computer, etc.) registers with a call-processing server and designates a second terminal (e.g., a hotel room telephone, etc.) to receive traffic (e.g., voice traffic, data traffic, text messages, etc.) that is intended for the user. The user designates the second terminal by specifying a telephone number (e.g., the main number of a hotel, etc.) and an extension (e.g., the particular hotel room phone, etc.). In response, the server enlists an interactive voice response (IVR) system to call the designated telephone number and to indicate to the answering party (e.g., a hotel operator, etc.) that a caller is attempting to reach the user at the designated extension. The server also provides a first signal to the first terminal via the signaling channel, wherein the first signal represents information that requires an action by the user.

The answering party puts the IVR system-originated call through to the user. Using the second terminal, the user provides back to the IVR system a second signal that has some relationship to the first signal. If the second signal compares satisfactorily to the first signal, the IVR system notifies the call-processing server, and the server bridges the calling party to the user on the second terminal.

The illustrative embodiments of the present invention are advantageous over some techniques in the prior art for several reasons. First, the user is required to receive a first signal on one terminal and respond with a second signal on a different terminal. Second, in some embodiments the call-processing server transmits the first signal on the signaling channel and expects the user, by using the second terminal, to respond back on a different communications channel (e.g., a media channel, a circuit-switched channel, etc.). Third, in some embodiments the first signal that the call-processing server transmits is less easily read by machine (i.e., the first terminal) than the second signal that the server expects back from the user. By communicating the first and second signals across different terminals and different communications channels, as well as by considering the content of the signals, the illustrative embodiments lessen the ability of an adversary (e.g., through malware, etc.) to control the terminals.

An illustrative embodiment of the present invention comprises: transmitting a first signal to a first telecommunications terminal; receiving at a server a second signal from a second telecommunications terminal; and determining whether or not to grant a privilege to the second telecommunications terminal based on the relationship of the first signal to the second signal; wherein the first telecommunications terminal and the second telecommunications terminal are physically distinct.

DETAILED DESCRIPTION

Figure 1:
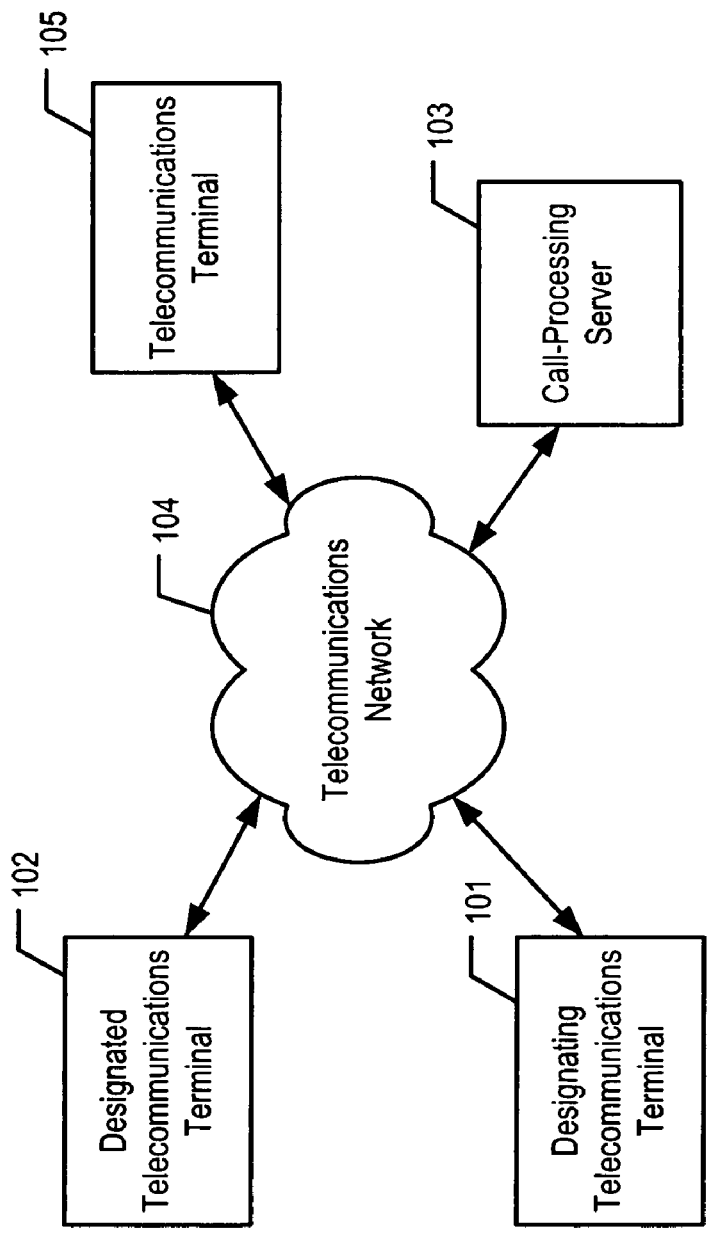
FIG. 1 depicts a block diagram of telecommunications system 100 in the prior art.
Figure 2:
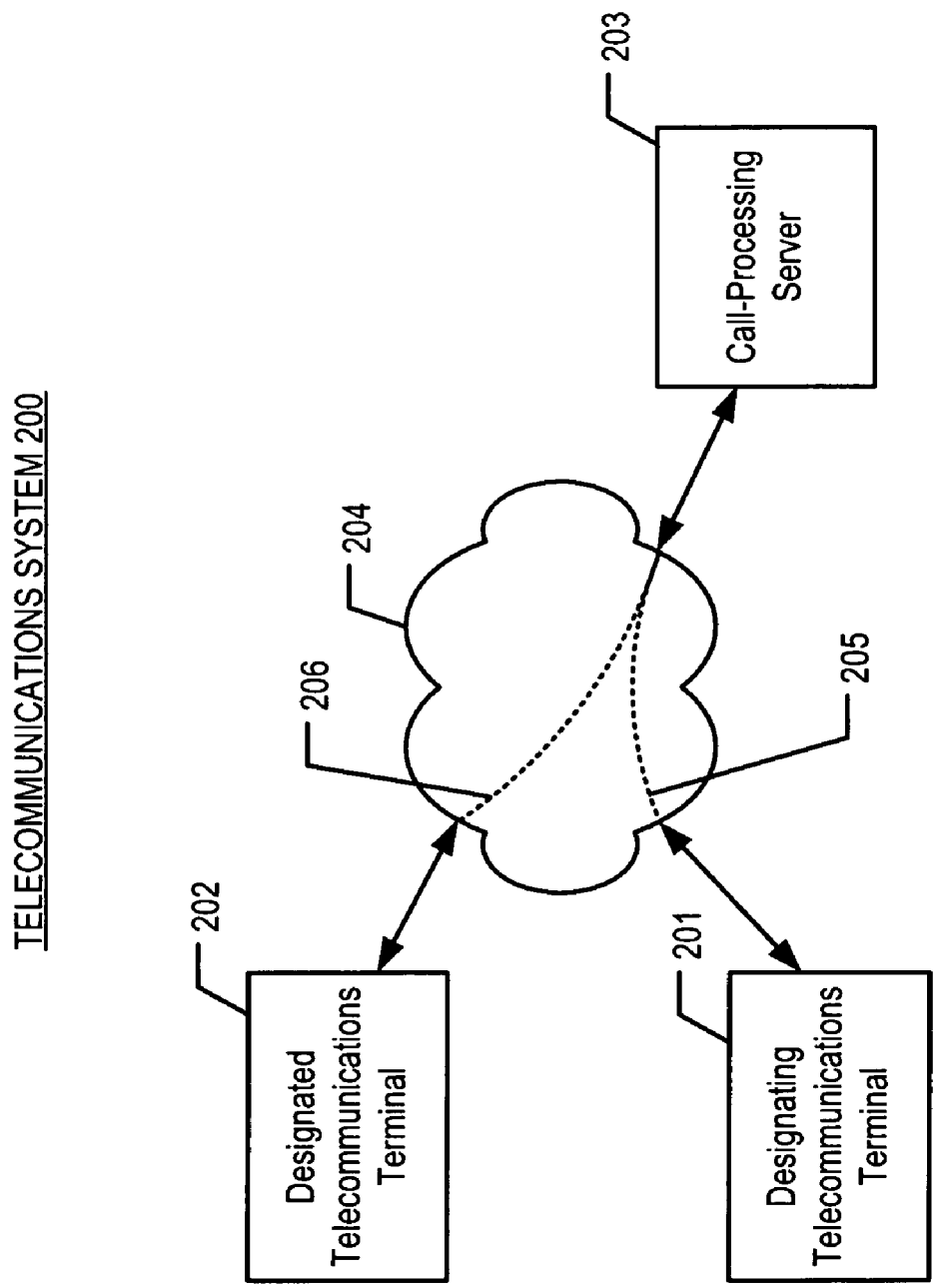
FIG. 2 depicts a block diagram of telecommunications system 200 in accordance with the first illustrative embodiment of the present invention.

FIG. 2 depicts a block diagram of telecommunications system 200 in accordance with the first illustrative embodiment of the present invention. Telecommunications system 200 comprises designating telecommunications terminal 201, designated telecommunications terminal 202, call-processing server 203, and telecommunications network 204, interconnected as shown.

Designating telecommunications terminal 201 is a softphone, as is known in the art, which operates as a portable computer (e.g., a laptop, handheld personal digital assistant [PDA], etc.). Some of the telecommunications services that terminal 201 provides include placing and receiving calls, emailing, instant messaging, and so forth. Terminal 201 interacts with call-processing server 203 to initiate a session to provide a telecommunications service. In some embodiments, terminal 201 interacts with call-processing server 203 via a first communications channel (e.g., signaling channel 205, etc.). For example, terminal 201 can be a signaling endpoint, as is known in the art. Terminal 201 communicates signaling information to call-processing server 203 via the Session Initiation Protocol (SIP). In some alternative embodiments, terminal 201 might communicate with call-processing server 203 via a different protocol (e.g., H.323, etc.).

In some embodiments, once a session has been initiated, terminal 201 transmits via telecommunications network 204 session-related traffic, such as voice or data, in a packet format (e.g., via Internet Protocol, etc.) to one or more destinations. Terminal 201 might also receive session-related traffic from one or more sources via telecommunications network 204.

It will be clear to those skilled in the art how to make and use designating telecommunications terminal 201.

Designated telecommunications terminal 202 is a telecommunications terminal that is capable of placing and receiving calls, as well as exchanging traffic (e.g., voice, data, etc.) with other telecommunications terminals via network 204. Terminal 202 is an Internet Protocol-capable terminal that transmits and receives packets of information. Terminal 202 is physically distinct from terminal 201 with an address (e.g., an Internet Protocol address, a telephone number identifier, etc.) different from that of terminal 201, in accordance with the first illustrative embodiment. As part of an initiated session, terminal 202 transmits and receives traffic, via a second communications channel (e.g., media channel 206, etc.) in some embodiments. For example, terminal 202 can be a media endpoint, as is known in the art. In some alternative embodiments, terminal 202 might be another type of terminal, such as a circuit-based terminal (e.g., a Plain Old Telephone Service wireline telephone, etc.). It will be clear to those skilled in the art how to make and use designated telecommunications terminal 202.

Figure 3:
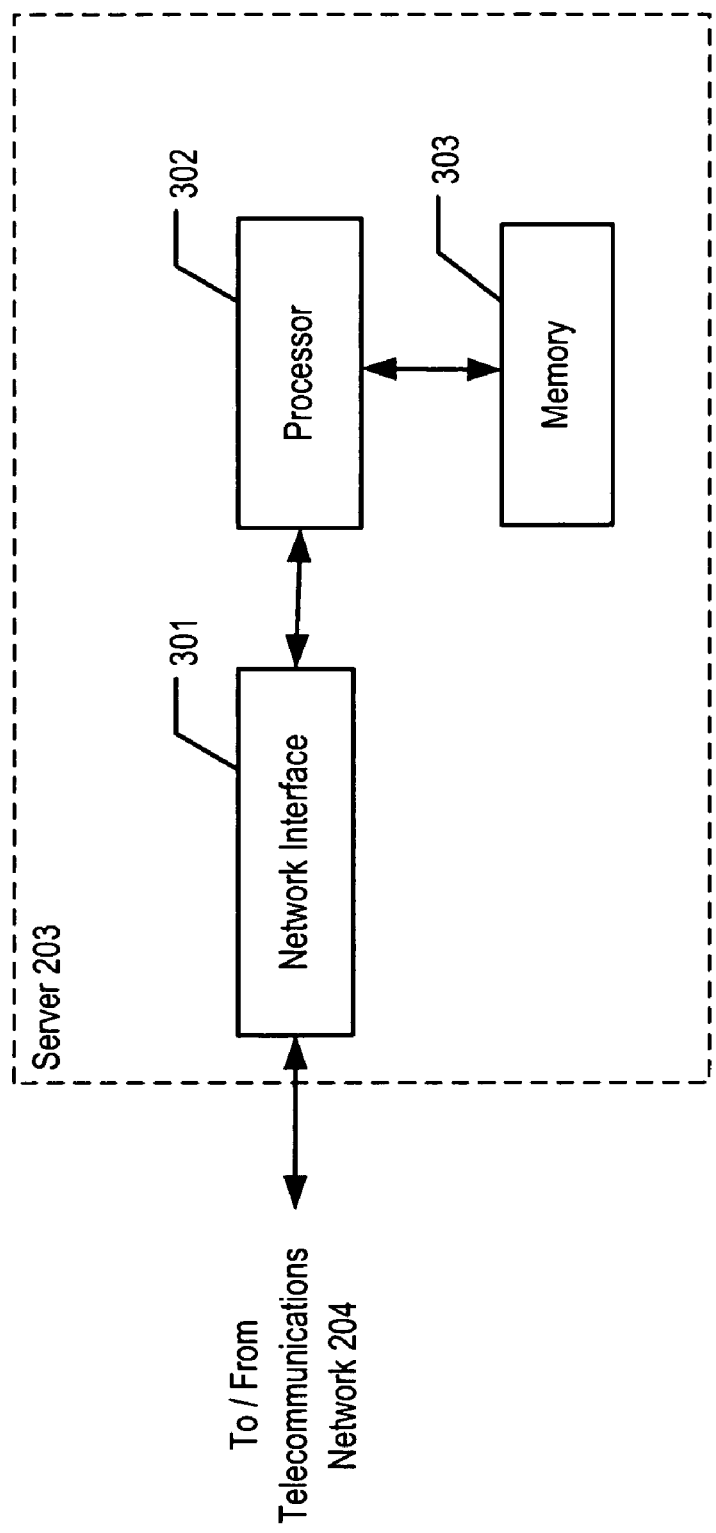
FIG. 3 depicts a block diagram of the salient components of call-processing server 203, in accordance with the first illustrative embodiment of the present invention.

Call-processing server 203 is a data-processing system (e.g., at an office building, at a central office switching center, etc.) that is capable of exchanging signaling information and traffic with terminals 201 and 202. Call-processing server 203's interaction with terminals 201 and 202 is supported by telecommunications network 204, which is equivalent to telecommunications network 104 and, as such, will not be described further. Moreover, call-processing server 203 enables a telecommunications user to designate a telecommunications terminal identifier, such as a telephone number (with or without an extension) or an Internet Protocol address, to which to extend an incoming call. The structure of call-processing server 203 is depicted in FIG. 3.

In accordance with the first illustrative embodiment, call-processing server 203 is capable of exchanging messages to determine whether or not to grant one or more privileges to terminal 202. The tasks that are related to call-processing server 203's interaction with terminals 201 and 202 are described below and with respect to FIGS. 4 and 5. As those who are skilled in the art will appreciate, the functionality of determining whether or not to grant one or more privileges can be alternatively performed somewhere other than at call-processing server 203.

Some alternative embodiments might employ a private branch exchange, as is well-known in the art, in conjunction with call-processing server 203. For example, the private branch exchange might be responsible for accommodating incoming and outgoing voice traffic, leaving call-processing server 203 to handle the specific interactions, described in this disclosure, with the signaling and media channels.

It will be clear to those skilled in the art, after reading this disclosure, how to make and use call-processing server 203.

FIG. 3 depicts a block diagram of the salient components of call-processing server 203, in accordance with the first illustrative embodiment of the present invention. Call-processing server 203 comprises network interface 301, processor 302, and memory 303, interconnected as shown.

Network interface 301 comprises a receiving part and a transmitting part. The receiving part receives signals from telecommunications network 204, and forwards the information encoded in the signals to processor 302, in well-known fashion. The transmitting part receives information from processor 302, and outputs signals that encode this information to telecommunications network 204, in well-known fashion. It will be clear to those skilled in the art how to make and use network interface 301.

Processor 302 is a general-purpose processor that is capable of: receiving information from network interface 301; reading data from and writing data into memory 303; executing the tasks described below and with respect to FIGS. 4 and 5; and transmitting information to network interface 301. In some alternative embodiments of the present invention, processor 302 might be a special-purpose processor. In either case, it will be clear to those skilled in the art, after reading this disclosure, how to make and use processor 302.

Memory 303 stores data and executable instructions, in well-known fashion, and is a combination of volatile and non-volatile memory. It will be clear to those skilled in the art how to make and use memory 303.

Figure 4:
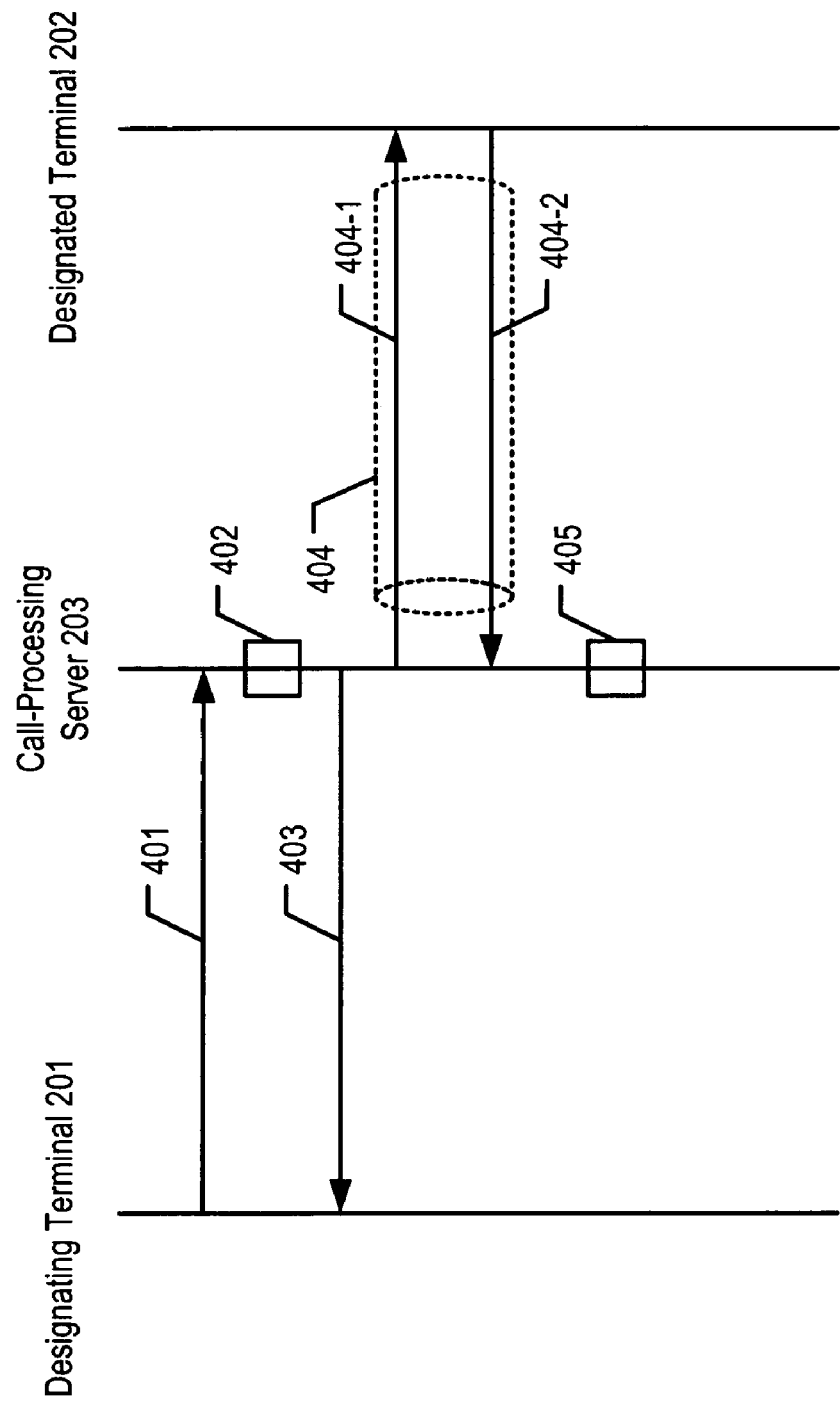
FIG. 4 depicts a first message-flow diagram of the salient events associated with determining whether or not to grant privileges to terminal 202, in accordance with the first illustrative embodiment of the present invention.

FIG. 4 depicts a first message-flow diagram of the salient events associated with determining whether or not to grant privileges to terminal 202, in accordance with the first illustrative embodiment of the present invention. In this message flow, call-processing server 203 provides a first signal to terminal 201 and subsequently expects a second signal from terminal 202. It will be clear to those skilled in the art which events depicted in FIG. 4 can occur simultaneously or in a different order than that depicted.

At event 401, terminal 201 transmits to call-processing server 203 one or more messages that comprise (i) a registration and (ii) a designation of terminal 202 to be granted a privilege (e.g., serving as a media endpoint, etc.), in well-known fashion. For example, terminal 201's user might want to conduct calls by using nearby terminal 202, a telephone that is optimized for voice calls because terminal 202 offers better voice quality than the laptop that serves as terminal 201.

At task 402, server 203 receives the designation of terminal 202 and determines whether or not to validate the relationship of terminals 201 and 202. As those who are skilled in the art will appreciate, the validation can be performed unconditionally, periodically, sporadically, based on terminal 201, based on terminal 202, and so forth.

At task 403, upon deciding to validate the relationship of terminals 201 and 202, server 203 transmits a first signal to terminal 201 on a first communications channel. In accordance with the first illustrative embodiment, the first communications channel is a signaling channel. The first signal comprises information that will be used to determine whether or not to grant privileges, such as allowing terminal 202 to be a media endpoint for future calls. In accordance with the first illustrative embodiment of the present invention, the first signal is less easily read by a machine (e.g., terminal 201, etc.) than a second signal to be provided by the user through terminal 202. For example, the first signal can comprise non-machine-readable information, such as that which is used for on-line registration or purchasing where a distorted or partially-obscured (but human-readable) image of a word is presented to the user, in well-known fashion; the user must then type in the word for verification. Server 203, in some embodiments, also provides instructions via the signaling channel for the user of terminal 202 to follow. For example, text-based instructions might specify inputting, using the terminal 202's keypad, the word that appears in the image presented to terminal 201.

Meanwhile, server 203 also initiates session 404 with terminal 202 in well-known fashion. At event 404-1, server 203 alerts terminal 202 of the session being set up on a second communications channel. In accordance with the first illustrative embodiment, the second communications channel is a media channel. Server 203 also provides instructions on the media channel for the user of terminal 202 to follow. For example, the audio-based instructions might specify inputting, using the terminal 202's keypad, the word that appears in the image presented to terminal 201.

At event 404-2, terminal 202 transmits on the media channel a second signal. The second signal comprises information provided by the user at terminal 202. For example, if the first signal received by terminal 201 comprises a distorted image of the word "elephant", the user of terminal 202 would indicate (e.g., via terminal 202's keypad, via speaking into terminal 202's microphone, etc.) that the received word is "elephant". If the user enters a response via the keypad, terminal 202 transmits the second signal as one or more dual tone multi-frequency signals (i.e., "touch tones").

At task 405, server 203 receives the second signal in well-known fashion. In accordance with the first illustrative embodiment of the present invention, server 203 then determines whether or not to grant one or more privileges to terminal 202 based on the relationship of the first signal to the second signal. Continuing with the example presented above, if the transmitted first signal comprises an image of the word "elephant" and the received second signal comprises an indication that the terminal 202's user understood the word to be "elephant", then server 203 grants the privilege, such as allowing terminal 202 to place calls or to receive calls, or both. If, however, the received second signal indicates an incorrect word or if no second signal was received, then server 203 does not grant the privilege.

Figure 5:
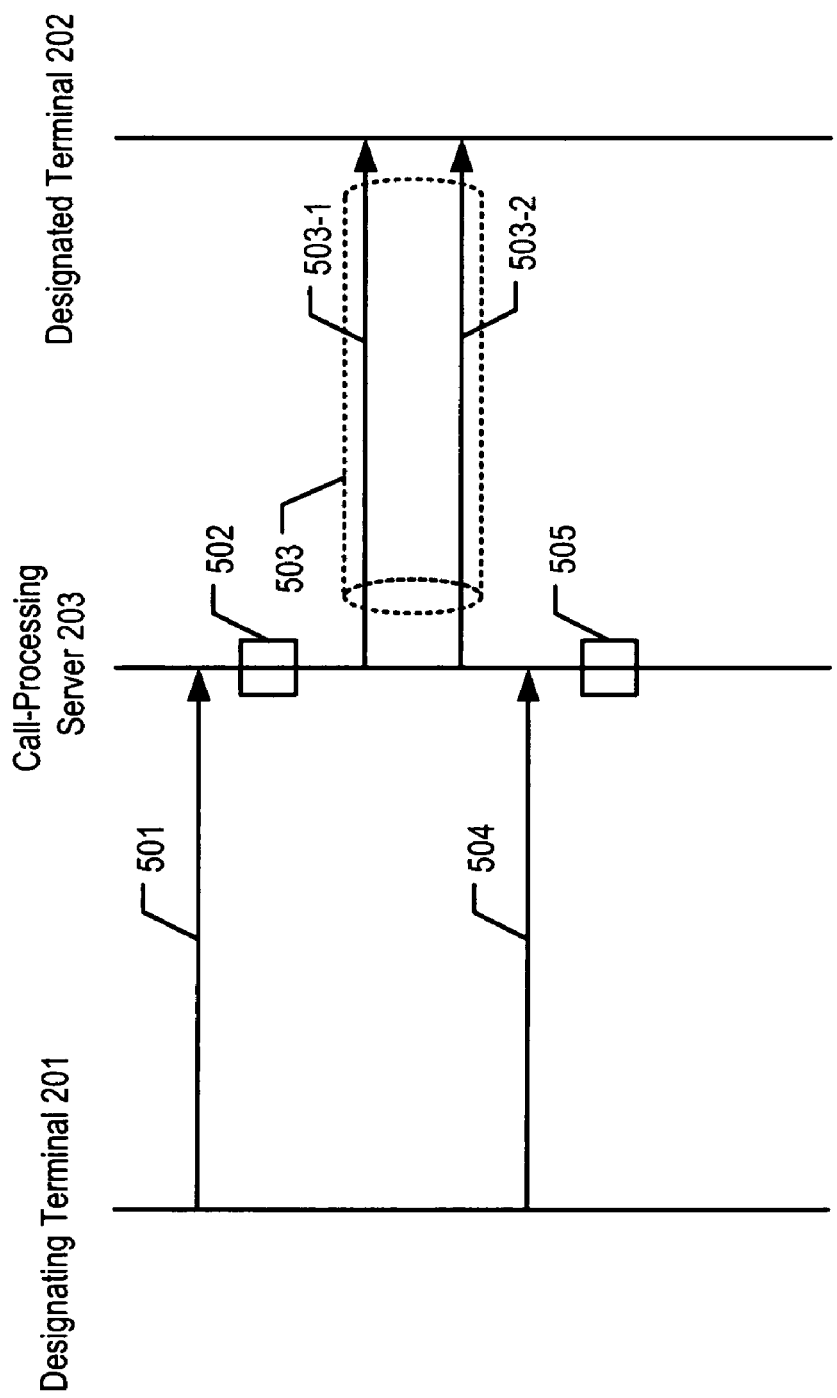
FIG. 5 depicts a second message-flow diagram of the salient events associated with determining whether or not to grant privileges to terminal 202, in accordance with the first illustrative embodiment of the present invention.

FIG. 5 depicts a second message-flow diagram of the salient events associated with determining whether or not to grant privileges to terminal 202, in accordance with the first illustrative embodiment of the present invention. In this message flow, call-processing server 203 provides a first signal to terminal 202 and subsequently expects a second signal from terminal 201. It will be clear to those skilled in the art which events depicted in FIG. 5 can occur simultaneously or in a different order than that depicted.

At event 501, terminal 201 transmits to call-processing server 203 one or more messages that comprise (i) a registration and (ii) a designation of terminal 202 to be granted a privilege (e.g., serving as a media endpoint, etc.), in well-known fashion. For example, terminal 201's user might want to conduct calls by using nearby terminal 202, a telephone that is optimized for voice calls because terminal 202 offers better voice quality than the laptop that serves as terminal 201.

At task 502, server 203 receives the designation of terminal 202 and determines whether or not to validate the relationship of terminals 201 and 202. As those who are skilled in the art will appreciate, the validation can be performed unconditionally, periodically, sporadically, based on terminal 201, based on terminal 202, and so forth.

At task 503, upon deciding to validate the relationship of terminals 201 and 202, server 203 initiates session 503 with terminal 202 in well-known fashion. At event 503-1, server 203 alerts terminal 202 of the session being set up on a media channel. Server 203 also provides instructions on the media channel for the user of terminal 202 to follow.

At event 503-2, server 203 then transmits a first signal to terminal 202 on the media channel. The first signal comprises information that will be used to determine whether or not to grant privileges, such as allowing terminal 202 to be a media endpoint for future calls.

At event 504, terminal 201 transmits on the signaling channel a second signal. The second signal comprises information provided by the user of terminals 201 and 202. For example, if the first signal received by terminal 202 comprises a distorted image of the word "elephant", the user of terminal 201 would indicate (e.g., via terminal 201's laptop keyboard, etc.) that the received word is "elephant".

At task 505, server 203 receives the second signal in well-known fashion. In accordance with the first illustrative embodiment of the present invention, server 203 then determines whether or not to grant one or more privileges to terminal 202 based on the relationship of the first signal to the second signal. Continuing with the example presented above, if the transmitted first signal comprises an image of the word "elephant" and the received second signal comprises an indication that the terminal 202's user understood the word to be "elephant", then server 203 grants the privilege, such as allowing terminal 202 to place calls or to receive calls, or both. If, however, the received second signal indicates an incorrect word or if no second signal was received, then server 203 does not grant the privilege.

Figure 6:
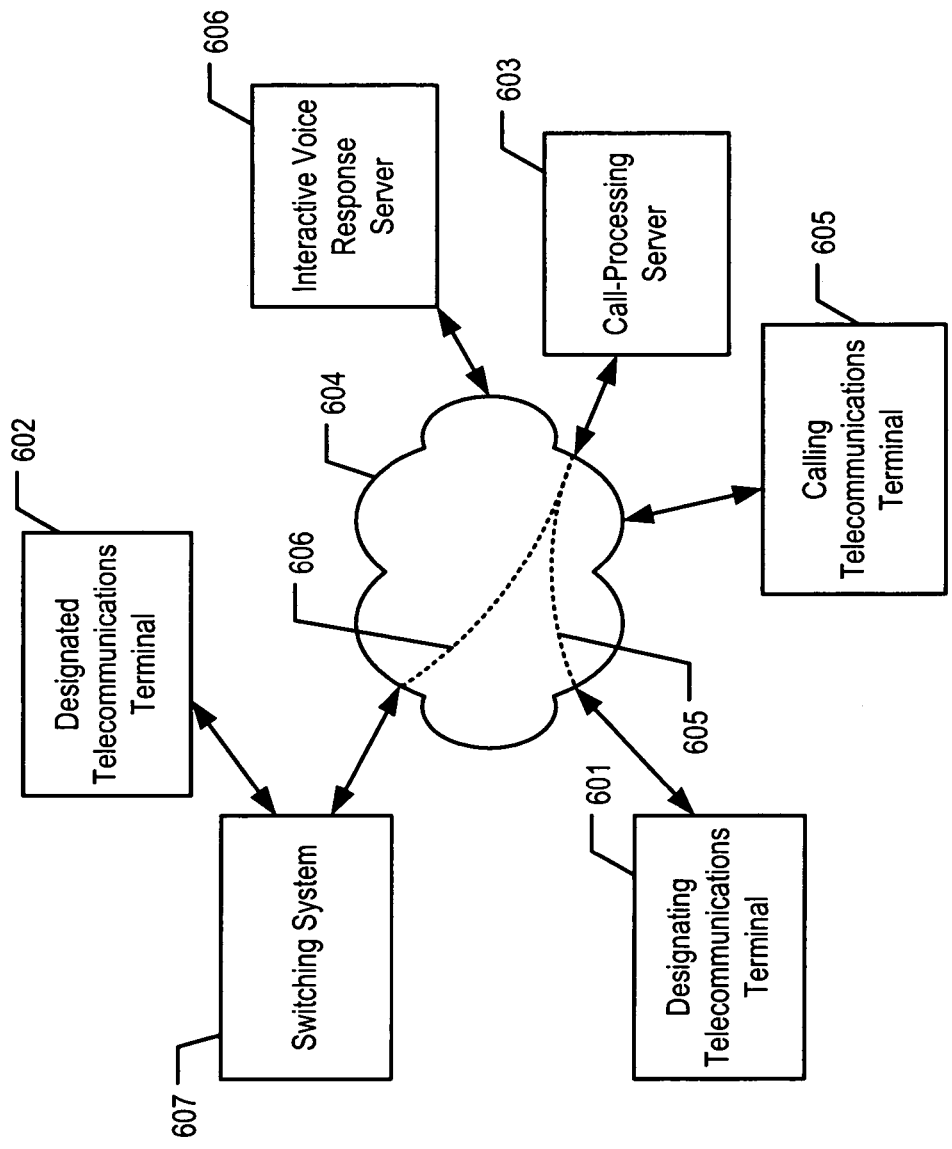
FIG. 6 depicts a block diagram of telecommunications system 600 in accordance with the second illustrative embodiment of the present invention.

FIG. 6 depicts a block diagram of telecommunications system 600 in accordance with the second illustrative embodiment of the present invention. Telecommunications system 600 comprises designating telecommunications terminal 601, designated telecommunications terminal 602, call-processing server 603, telecommunications network 604, calling telecommunications terminal 605, interactive voice response server 606, and switching system 607, interconnected as shown.

Designating telecommunications terminal 601 is a softphone, as is known in the art, which operates as a portable computer (e.g., a laptop, handheld personal digital assistant [PDA], etc.). Some of the telecommunications services that terminal 601 provides include placing and receiving calls, emailing, instant messaging, and so forth. Terminal 601 interacts with call-processing server 603 to initiate a session to provide a telecommunications service. In some embodiments, terminal 601 interacts with call-processing server 603 via a signaling channel (e.g., signaling channel 605, etc.). For example, terminal 601 can be a signaling endpoint, as is known in the art. Terminal 601 communicates signaling information to call-processing server 603 via the Session Initiation Protocol (SIP). In some alternative embodiments, terminal 601 might communicate with call-processing server 603 via a different protocol (e.g., H.323, etc.).

In some embodiments, once a session has been initiated, terminal 601 transmits via telecommunications network 604 session-related traffic, such as voice or data, in a packet format (e.g., via Internet Protocol, etc.) to one or more destinations. Terminal 601 might also receive session-related traffic from one or more sources via telecommunications network 604.

It will be clear to those skilled in the art how to make and use designating telecommunications terminal 601.

Designated telecommunications terminal 602 is a telecommunications terminal that is capable of placing and receiving calls, as well as exchanging traffic (e.g., voice, data, etc.) with other telecommunications terminals via switching system 607 and network 604. Terminal 602 is an Internet Protocol-capable terminal that transmits and receives packets of information. Terminal 602 is physically distinct from terminal 601 with an address (e.g., an Internet Protocol address, a telephone number identifier, etc.) different from that of terminal 601, in accordance with the first illustrative embodiment. As part of an initiated session, terminal 602 transmits and receives traffic, via a media channel (e.g., media channel 606, etc.) in some embodiments. For example, terminal 602 can be a media endpoint, as is known in the art. In some alternative embodiments, terminal 602 might be another type of terminal, such as a circuit-based terminal (e.g., a Plain Old Telephone Service wireline telephone, etc.). It will be clear to those skilled in the art how to make and use designated telecommunications terminal 602.

Figure 7:
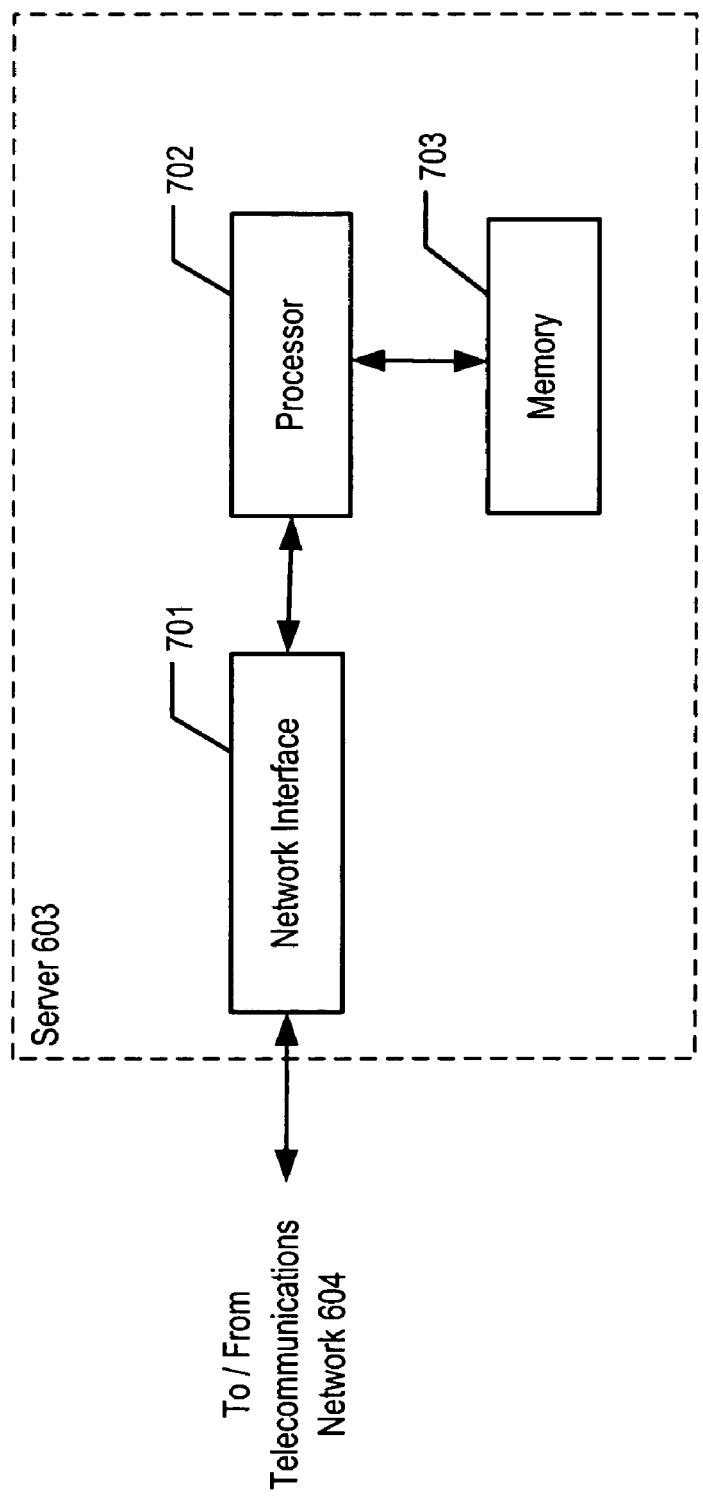
FIG. 7 depicts a block diagram of the salient components of call-processing server 603, in accordance with the second illustrative embodiment of the present invention.

Call-processing server 603 is a data-processing system (e.g., at an office building, at a central office switching center, etc.) that is capable of exchanging signaling information and traffic with terminals 601 and 602. Call-processing server 603's interaction with terminals 601 and 602 is supported by telecommunications network 604, which is equivalent to telecommunications network 104 and, as such, will not be described further. Call-processing server 603 is also capable of exchanging signaling information and traffic with interactive voice response server 606 via network 604, in well-known fashion. Moreover, call-processing server 603 enables a telecommunications user to designate a telecommunications terminal identifier, such as a telephone number (with or without an extension) or an Internet Protocol address, to which to extend an incoming call. The structure of call-processing server 603 is depicted in FIG. 7.

In accordance with the second illustrative embodiment, call-processing server 603 is capable of exchanging messages to determine whether or not to grant one or more privileges to terminal 602. The tasks that are related to call-processing server 603's interaction with terminals 601 and 602 are described below and with respect to FIG. 9. As those who are skilled in the art will appreciate, the functionality of determining whether or not to grant one or more privileges can be alternatively performed somewhere other than call-processing server 603.

Some alternative embodiments might employ a private branch exchange, as is well-known in the art, in conjunction with call-processing server 603. For example, the private branch exchange might be responsible for accommodating incoming and outgoing voice traffic, leaving call-processing server 603 to handle specific interactions, described in this disclosure, with the signaling and media channels.

It will be clear to those skilled in the art, after reading this disclosure, how to make and use call-processing server 603.

Calling telecommunications terminal 605 is capable of placing a call to a user, such as the user of terminal 601, in well-known fashion. It will be clear to those skilled in the art how to make and use terminal 605.

Interactive voice response (IVR) server 606 is a system that provides interactive voice response capability, in well-known fashion. IVR server 606 receives signaling information and voice traffic for the purpose of interacting (e.g., receiving selections, etc.) with a person, such as a telecommunications terminal user or a telephone operator associated with switching system 607. IVR server 606 presents one or more menus or announcements to the person and receives input from the person (e.g., speech signals, keypad input, etc.). IVR server 606 transmits data back to call-processing server 603 in response to and based on the received selections, in accordance with the second illustrative embodiment of the present invention. It will be clear to those skilled in the art, after reading this disclosure, how to make and use interactive voice response server 606.

Switching system 607 handles incoming and outgoing calls for a particular facility (e.g., a hotel building, etc.) and for one or more telecommunications terminals at that facility (e.g., terminal 602, etc.). In accordance with the second illustrative embodiment of the present invention, switching system 607 is a private branch exchange with a switchboard that is staffed by an operator. In some alternative embodiments, switching system 607 is a private branch exchange that automatically switches calls. It will be clear to those skilled in the art how to make and use switching system 607.

FIG. 7 depicts a block diagram of the salient components of call-processing server 603, in accordance with the second illustrative embodiment of the present invention. Call-processing server 603 comprises network interface 701, processor 702, and memory 703, interconnected as shown.

Network interface 701 comprises a receiving part and a transmitting part. The receiving part receives signals from telecommunications network 604, and forwards the information encoded in the signals to processor 702, in well-known fashion. The transmitting part receives information from processor 702, and outputs signals that encode this information to telecommunications network 604, in well-known fashion. It will be clear to those skilled in the art how to make and use network interface 701.

Processor 702 is a general-purpose processor that is capable of: receiving information from network interface 701; reading data from and writing data into memory 703; executing the tasks described below and with respect to FIG. 9; and transmitting information to network interface 701. In some alternative embodiments of the present invention, processor 702 might be a special-purpose processor. In either case, it will be clear to those skilled in the art, after reading this disclosure, how to make and use processor 702.

Memory 703 stores data and executable instructions, in well-known fashion, and is a combination of volatile and non-volatile memory. It will be clear to those skilled in the art how to make and use memory 703.

Figure 8:
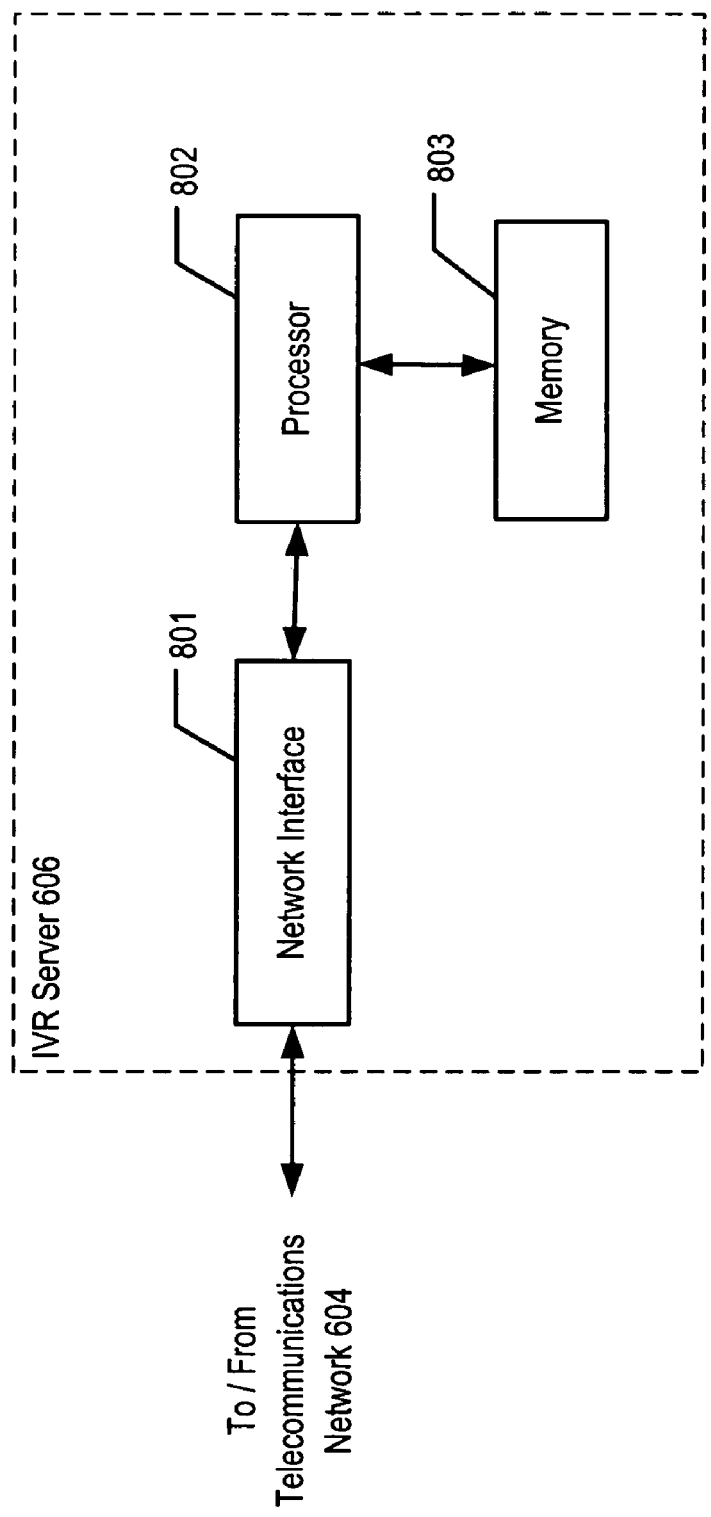
FIG. 8 depicts a block diagram of the salient components of interactive voice response server 606, in accordance with the second illustrative embodiment of the present invention.

FIG. 8 depicts a block diagram of the salient components of interactive voice response server 606, in accordance with the second illustrative embodiment of the present invention. Interactive voice response server 606 comprises network interface 801, processor 802, and memory 803, interconnected as shown.

Network interface 801 comprises a receiving part and a transmitting part. The receiving part receives signals from telecommunications network 604, and forwards the information encoded in the signals to processor 802, in well-known fashion. The transmitting part receives information from processor 802, and outputs signals that encode this information to telecommunications network 604, in well-known fashion. It will be clear to those skilled in the art how to make and use network interface 801.

Processor 802 is a general-purpose processor that is capable of: receiving information from network interface 801; reading data from and writing data into memory 803; executing the tasks described below and with respect to FIG. 9; and transmitting information to network interface 801. In some alternative embodiments of the present invention, processor 802 might be a special-purpose processor. In either case, it will be clear to those skilled in the art, after reading this disclosure, how to make and use processor 802.

Memory 803 stores data and executable instructions, in well-known fashion, and is a combination of volatile and non-volatile memory. It will be clear to those skilled in the art how to make and use memory 803.

Figure 9:
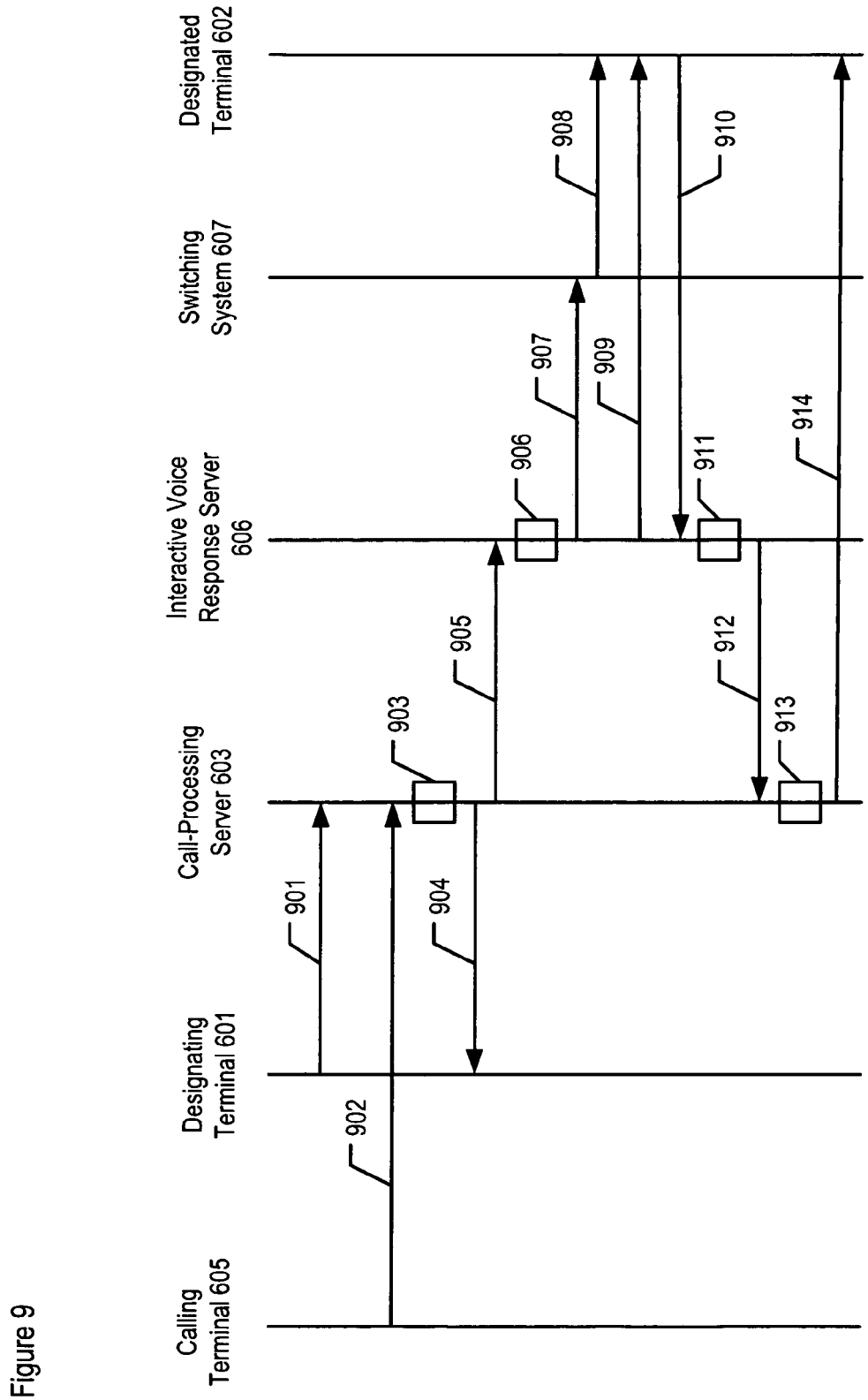
FIG. 9 depicts a message-flow diagram of the salient events associated with determining whether or not to grant privileges to terminal 602, in accordance with the second illustrative embodiment of the present invention.

FIG. 9 depicts a message-flow diagram of the salient events associated with determining whether or not to grant privileges to terminal 602, in accordance with the second illustrative embodiment of the present invention. It will be clear to those skilled in the art which events depicted in FIG. 9 can occur simultaneously or in a different order than that depicted.

In the example that is depicted in FIG. 9, a telecommunications user has the capability through call-processing server 603 to have calls that are made to her office telephone number extended to a designated telephone number or other address (e.g., an Internet Protocol address, etc.) outside the office. In this example, the user is currently staying at a hotel and wishes to designate the telephone in her hotel room to receive the calls that are made to her office telephone number. The room telephone, however, does not have a directly dialed number; instead, all incoming calls to the room telephone have to be switched through by the hotel operator. The user has brought along her laptop, which supports a softphone function and is represented in FIG. 9 as terminal 601. Terminal 601 is able to communicate in part via the hotel's local area network (e.g., a WiFi network, etc.). Terminal 602 represents the room telephone. Call-processing server 603 is the data-processing system that serves the office building at which the user works, including her office telephone. Interactive voice response server 606 is also associated with server 603 and the office building.

At event 901, terminal 601 transmits to call-processing server 603 one or more messages that comprise (i) a registration and (ii) a designation of terminal 602 to be granted a privilege (e.g., serving as a media endpoint, etc.), in well-known fashion. The designation of terminal 602 comprises: (i) a telephone number (e.g., a 10-digit number in North America, etc.) that routes to the hotel private branch exchange, and (ii) an extension that corresponds to the particular room phone at the hotel. Terminal 601's user invokes this message flow to conduct calls by using nearby terminal 602, a hotel room telephone that is optimized for voice calls and that offers better voice quality than her laptop softphone of terminal 601.

At event 902, which occurs independently of event 901 and possibly hours later, calling telecommunications terminal 605 places a call to the office telephone number of terminal 602's user. As a result, the call is routed to call-processing server 603, in well-known fashion.

At task 903, server 603 receives the incoming call, checks the user's database, and determines that the user has specified a telephone number and extension that corresponds to terminal 602 and that requires hotel operator intervention. Because the incoming call is intended for terminal 602, server 603 decides to validate the relationship of terminals 601 and 602. It will be clear to those skilled in the art how to determine when to validate the relationship of the two terminals, as described earlier and with respect to FIGS. 4 and 5.

At event 904, upon deciding to validate the relationship of terminals 601 and 602, server 603 transmits a first signal to terminal 601 on a first communications channel. In accordance with the second illustrative embodiment, the first communications channel is a signaling channel. The first signal comprises information that will be used to determine whether or not to grant privileges, such as allowing terminal 602 to be a media endpoint for future calls to the user. In accordance with the second illustrative embodiment of the present invention, the first signal is less easily read by a machine (e.g., terminal 601, etc.) than a second signal to be provided by the user at terminal 602, as described earlier and with respect to task 403 of FIG. 4. Server 603 also provides instructions via the signaling channel for the user to follow.

In some alternative embodiments, the first signal might be easily read by a machine. For example, in some applications securing terminal 601 from malware or from the effects of malware might not be an issue or might be accomplished through other means.

Meanwhile, at event 905 call-processing server 603 also transmits to IVR server 606: (i) the telephone number of the hotel, (ii) the room extension, and (iii) the first signal.

At task 906, IVR server 606 calls switching system 607 in well-known fashion by using the telephone number of the hotel that was provided by call-processing server 603.

At event 907, IVR server 606 announces to the hotel operator at switching system 607 that there is an incoming call and provides the hotel operator with the room extension.

At event 908, switching system 607 alerts terminal 602 of an incoming call. The user of terminal 602 answers the call.

At event 909, IVR server 606 provides instructions (e.g., audio-based, etc.) for the user of terminal 602 to follow. For example, the instructions might specify inputting, using the terminal 602's keypad, the information provided as part of the first signal transmitted previously to terminal 601.

At event 910, terminal 602 transmits on a second communications channel a second signal. In accordance with the second illustrative embodiment, the second communications channel is a media channel. The second signal comprises information provided by the user of terminals 601 and 602. For example, if the first signal received by terminal 601 comprises a distorted image of the word "elephant", the user of terminal 602 would indicate (e.g., via terminal 602's keypad, via speaking into terminal 602's microphone, etc.) that the received word is "elephant". If the user enters a response via the keypad, terminal 602 transmits the second signal as one or more dual tone multi-frequency signals (i.e., "touch tones").

At task 911, IVR server 606 receives the second signal in well-known fashion. In accordance with the second illustrative embodiment of the present invention, IVR server 606 then determines whether or not the relationship of the first signal (and terminal 601) to the second signal (and terminal 602) is valid. Continuing with the example presented earlier, if the transmitted first signal comprises an image of the word "elephant" and the received second signal comprises an indication that the terminal 602's user understood the word to be "elephant", then IVR server 606 determines the relationship to be valid and removes itself from the call flow. If, however, the received second signal indicates an incorrect word or if no second signal was received, then server 603 determines the relationship to be invalid.

At event 912, IVR server 606 notifies call-processing server 603 of the success or failure in validating the relationship between terminals 601 and 602.

At task 913, call-processing server 603 decides whether or not to allow the call through to terminal 602, based on the validation of the relationship between terminals 601 and 602.

At event 914, call-processing server 603 allows the call through to terminal 602 if the relationship between the two terminals has been validated.

As will be appreciated by those skilled in the art, although the second illustrative embodiment of the present invention employs both call-processing server 603 and interactive voice response (IVR) server 606, some alternative embodiments might employ only one of processing server 603 and IVR server 606, with the capability of performing the methods depicted in FIG. 9.

Furthermore, as will be appreciated by those skilled in the art, some embodiments that are alternative to the illustrative embodiments might also employ a private branch exchange (or other data-processing system) to perform the methods depicted in FIGS. 4, 5, and 9. Some other alternative embodiments might employ a private branch exchange to perform the methods depicted in FIGS. 4, 5, and 9 without one or any of call-processing server 203/603 and IVR server 606.

It is to be understood that the above-described embodiments are merely illustrative of the present invention and that many variations of the above-described embodiments can be devised by those skilled in the art without departing from the scope of the invention. For example, in this Disclosure, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the disclosure to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Disclosure are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   transmitting by a server a first signal to a first telecommunications terminal;
   receiving at the server a second signal from a second telecommunications terminal, wherein the second signal is received as part of a session with the second telecommunications terminal that is initiated by the server; and
   determining by the server whether to grant a privilege to the second telecommunications terminal based on the relationship of the first signal to the second signal;
   wherein the first telecommunications terminal and the second telecommunications terminal are physically distinct.

2. The method of claim 1 wherein a first address that is associated with the first telecommunications terminal is distinct from a second address that is associated with the second telecommunications terminal.

3. The method of claim 1 wherein the first signal is transmitted into a signaling channel and the second signal is received via a media channel.

4. The method of claim 1 wherein the first telecommunications terminal is a signaling endpoint and the second telecommunications terminal is a media endpoint.

5. The method of claim 1 wherein the first signal is machine-readable, wherein the second signal is machine-readable, and wherein the first signal is less easily read by a machine than the second signal.

6. The method of claim 1 wherein the second signal is conveyed via dual tone multi-frequency signaling.

7. The method of claim 1 wherein the privilege is a quality-of-service that is associated with the second telecommunications terminal.

8. A method comprising:
   transmitting by a server a first signal to a first telecommunications terminal via a first communications channel;
   receiving at the server a second signal from a second telecommunications terminal via a second communications channel; and
   determining by the server whether to grant a privilege to the second telecommunications terminal based on the relationship of the first signal to the second signal;
   wherein the first signal is machine-readable, wherein the second signal is machine-readable, and wherein the first signal is less easily read by a machine than the second signal.

9. The method of claim 8 wherein the first signal is transmitted to the first telecommunications terminal as part of a session with the first telecommunications terminal that is initiated by the server.

10. The method of claim 8 wherein the first signal is transmitted into a media channel and the second signal is received via a signaling channel.

11. The method of claim 8 wherein the first telecommunications terminal is a media endpoint and the second telecommunications terminal is a signaling endpoint.

12. The method of claim 8 wherein a first address that is associated with the first telecommunications terminal is distinct from a second address that is associated with the second telecommunications terminal.

13. The method of claim 8 wherein the privilege is a quality-of-service that is associated with the second telecommunications terminal.

14. A method comprising:
   transmitting by a server a first signal to a first address;
   receiving at the server a second signal from a second address; and
   determining by the server whether to grant a privilege to a telecommunications terminal that is associated with the second address, based on the relationship of the first signal to the second signal;
   wherein the second signal is received from the second address as part of a session with the telecommunications terminal that is initiated by the server.

15. The method of claim 14 wherein the first address and the second address are associated with physically distinct telecommunications terminals.

16. The method of claim 14 wherein the first signal is transmitted into a signaling channel and the second signal is received via a media channel.

17. The method of claim 14 wherein the first address is associated with a signaling endpoint and the second address is associated with a media endpoint.

18. The method of claim 14 wherein the first signal is machine-readable, wherein the second signal is machine-readable, and wherein the first signal is less easily read by a machine than the second signal.

19. The method of claim 14 wherein the second address comprises a telephone number.

20. The method of claim 14 wherein the privilege is a quality-of-service that is associated with the telecommunications terminal.

21. A method comprising:
   transmitting by a server a first signal to a first telecommunications terminal;
   receiving at the server a second signal from a second telecommunications terminal; and determining by the server whether to grant a privilege to the first telecommunications terminal based on the relationship of the first signal to the second signal;

wherein the first telecommunications terminal and the second telecommunications terminal are physically distinct.

22. The method of claim 21 wherein the first signal is machine-readable, wherein the second signal is machine-readable, and wherein the first signal is less easily read by a machine than the second signal.

23. The method of claim 21 wherein a first address that is associated with the first telecommunications terminal is distinct from a second address that is associated with the second telecommunications terminal.

* * * * *